United States Patent
Sprogis (10) Patent No.: US 10,264,393 B2
(45) Date of Patent: Apr. 16, 2019

(54) MERCHANT BIDDING AND REWARDS ON CONSUMER INTENT

(71) Applicant: Cubic Corporation, San Diego, CA (US)

(72) Inventor: Robert Sprogis, Wake Forest, NC (US)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 15/786,977

(22) Filed: Oct. 18, 2017

(65) Prior Publication Data

US 2018/0109916 A1    Apr. 19, 2018

Related U.S. Application Data (60) Provisional application No. 62/409,776, filed on Oct. 18, 2016.

(51) Int. Cl.
*H04W 4/021* (2018.01)
*G01C 21/36* (2006.01)
(Continued)

(52) U.S. Cl.
CPC .......... *H04W 4/021* (2013.01); *G01C 21/362* (2013.01); *G06Q 20/3224* (2013.01);
(Continued)

(58) Field of Classification Search
CPC ......... G06Q 30/01205; G06Q 30/0259; G06Q 30/0261; G06Q 30/0281
(Continued)

(56) References Cited

U.S. PATENT DOCUMENTS 8,630,897 B1 *  1/2014  Prada Gomez .... G06Q 30/0241
                                                        705/14.11
2013/0159086 A1   6/2013  Richard
(Continued)

FOREIGN PATENT DOCUMENTS

EP       2866184 A1    4/2015
WO    2016/012994 A1    1/2016

OTHER PUBLICATIONS

International Search Report and Written Opinion dated Nov. 28, 2017 for PCT/US2017/057125; all pages.

*Primary Examiner* — Allahyar Kasraian
(74) *Attorney, Agent, or Firm* — Kilpatrick Townsend & Stockton LLP (57) ABSTRACT

A method of increasing transit ridership includes receiving a travel destination from a mobile device, identifying a plurality of entities positioned within a predefined radius of the travel destination, and alerting the entities that the mobile device has selected the travel destination. The method also includes receiving, in response to the alert, at least one transit ride option from at least some of the entities, providing the at least one transit ride option to the mobile device, and receiving a selection of one transit ride option of the transit ride option from the mobile device. The method further includes detecting that the mobile device is present on a transit vehicle associated with the transit ride option, determining that the mobile device is present within an entity associated with the selected transit ride option, and providing a transit product to the mobile device based on the determination.

13 Claims, 6 Drawing Sheets

(51) Int. Cl.
*G06Q 30/06* (2012.01)
*H04W 4/02* (2018.01)
*H04W 4/04* (2009.01)
*H04W 4/12* (2009.01)
*G06Q 30/02* (2012.01)
*G06Q 20/32* (2012.01)
*G07B 15/00* (2011.01)

(52) U.S. Cl.
CPC ..... *G06Q 20/3274* (2013.01); *G06Q 20/3278* (2013.01); *G06Q 30/0207* (2013.01); *G06Q 30/0259* (2013.01); *G06Q 30/0261* (2013.01); *G06Q 30/06* (2013.01); *G07B 15/00* (2013.01); *H04W 4/025* (2013.01); *H04W 4/04* (2013.01); *H04W 4/12* (2013.01)

(58) Field of Classification Search
USPC .................. 705/7.34, 14.57, 24.58, 346
See application file for complete search history.

(56) References Cited

U.S. PATENT DOCUMENTS

| | | |
|---|---|---|
| 2015/0254720 A1 | 9/2015 | Newberg et al. |
| 2015/0269600 A1 | 9/2015 | Randle |
| 2017/0154348 A1* | 6/2017 | Biswas ............. G06Q 30/0206 |
| 2017/0236235 A1* | 8/2017 | Frankert ................ G06Q 50/30 705/13 |
| 2017/0300053 A1* | 10/2017 | Wengreen ............ G05D 1/0088 |

* cited by examiner

MERCHANT BIDDING AND REWARDS ON CONSUMER INTENT

CROSS-REFERENCES TO RELATED APPLICATIONS

This application claims priority to U.S. Provisional Patent Application No. 62/409,776, filed Oct. 18, 2016, entitled "MERCHANT BIDDING AND REWARDS ON CONSUMER INTENT," the entire disclosure of which is hereby incorporated by reference, for all purposes, as if fully set forth herein.

BACKGROUND OF THE INVENTION

With ever growing populations, cities and other municipal areas are experiencing problems associated with traffic congestion, having sufficient parking available, and other traffic-related infrastructure. In addition to these problems, the increased traffic increases $CO_2$ emissions, fuel consumption, and transit times. To address these issues, municipalities often utilize transit systems and rideshare programs to reduce the amount of traffic. However, these solutions can be very costly to implement and often suffer from lack of ridership, thereby diminishing the effects.

BRIEF SUMMARY OF THE INVENTION

Embodiments of the present invention are directed to systems and methods for increasing transit ridership. Embodiments allow entities, such as merchants, restaurants, and the like to offer to pay for some or all of a user's public transportation costs and/or other incentives in exchange for the user using public transit means to visit the selected entity. Such systems and methods serve to increase transit ridership, thereby reducing emissions and congestion associated with private modes of transportation. Additional benefits may also be realized.

In one aspect, a method of increasing transit ridership is provided. The method may include receiving a travel destination from a mobile device, identifying a plurality of entities positioned within a predefined radius of the travel destination, and alerting the plurality of entities that the mobile device has selected the travel destination. The method may also include receiving, in response to the alert, at least one transit ride option from at least some of the plurality of entities, providing the at least one transit ride option to the mobile device, and receiving a selection of one transit ride option of the at least one transit ride option from the mobile device. The method may further include detecting that the mobile device is present on a transit vehicle associated with the transit ride option; determining that the mobile device is present within an entity associated with the selected one transit ride option, and providing at least one item to the mobile device for presentation to one or both of a transit system or the entity associated with the selected one transit ride option based on the determination.

In another aspect, a system for increasing transit ridership is provided. The system may include a communications interface, a processing unit, and a memory. The memory may include instructions stored thereon that cause the processing unit to receive, using the communications interface, a travel destination from a mobile device, identify a plurality of entities positioned within a predefined radius of the travel destination, and alert, using the communications interface, the plurality of entities that the mobile device has selected the travel destination. The instructions may also cause the processing unit to receive, in response to the alert using the communications interface, at least one transit ride option from at least some of the plurality of entities, provide, using the communications interface, the at least one transit ride option to the mobile device, and receive, using the communications interface, a selection of one transit ride option of the at least one transit ride option from the mobile device. The instructions may further cause the processing unit to detect that the mobile device is present on a transit vehicle associated with the transit ride option, determine that the mobile device is present within an entity associated with the selected one transit ride option, and provide at least one item to the mobile device for presentation to one or both of a transit system or the entity associated with the selected one transit ride option based on the determination.

In another aspect, a non-transitory computer-readable medium for increasing transit ridership is provided. The computer-readable medium may include instructions, that when executed, cause a computing device to receive a destination location from a mobile device the destination location comprising an entity, alert the entity that the entity has been selected by the mobile device, and receive, in response to the alert, at least one transit ride option from the entity. The instructions may also cause the computing device to provide the at least one transit ride option to the mobile device, receive a selection of one transit ride option of the at least one transit ride option from the mobile device, and detect that the mobile device is present on a transit vehicle associated with the transit ride option. The instructions may further cause the computing device to determine that the mobile device is present within the entity and provide at least one item to the mobile device for presentation to one or both of a transit system or the entity based on the determination.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the invention(s) described herein are generally related to public transit. It will be understood, however, that the applications for the invention(s) are not so limited. It may be applied, for example, to other types of transportation. Specifically, embodiments of the invention are directed to systems and methods of increasing transit ridership, both in systems of mass transit such as buses and trains, as well as rideshare and shuttle services. This provides numerous benefits. For example, by increasing ridership in such systems, traffic congestion may be reduced, which not only reduces travel times but also reduces the emissions produced by vehicles in stop and go traffic and other congested traffic situations. Moreover, increased ridership entirely eliminates a large number of vehicles from being on the road, which has the effect of eliminating emissions related to these vehicles as well. Additionally, by reducing the number of cars on the road, parking needs at destinations such as hotels, attractions, retail establishments, restaurants, and the like may be reduced, which saves on parking infrastructure and frees up land for other uses. Increased ridership also allows the transit system (and the funding municipality) to recognize the benefits associated with an economy of scale. As each transit vehicle sees a higher percentage of its available seats or ridership positions being utilized, the transit system becomes more cost efficient to operate.

Transit systems are already in use to take consumers to destination entities, such as hotels, attractions, retail establishments, restaurants. However, many people often continue to use private forms of transportation to access such entities. Embodiments of the present invention help increase ridership to provide the benefits detailed above.

According to one embodiment, a user may invoke an entity intent session. Here, the user may identify an intent to visit a specific merchant or other destination entity. The user may use a mobile device to indicate, for example, that he intends to go to Selfridges in London. This indication may be provided to a transit and/or rideshare system, which may communicate the user's intent to Selfridges. In some embodiments, the intent may be provided directly to Selfridges from the mobile device. Selfridges may place a bid on the transit system that will reward the user to come to Selfridges. For example, Selfridges may offer a free transit ride, a free drink, payment of $5, and/or other incentives.

In another embodiment, the user may invoke a product intent session. In such an embodiment, the user identifies an intent to purchase a particular item or items and/or categories of goods, such as groceries. The user may indicate, for example, that he wants to purchase a television. Merchants who sell televisions are notified of this intent and effectively bid against each other to offer items to the user to incentivize the user to visit them using a public transit and/or rideshare means. For example, three different entities may offer items to the user in exchange for visiting the entity by using a transit system. The items may also include one or more transit ride options, such as free subway rides, train rides, and/or rideshare vouchers. The entity providing the best item may have its item sent to and/or selected by the user.

In either type of session, the user is notified of the offered reward(s) and may accept or decline. If the user accepts (often within a predetermined acceptance timeframe), a time upon which to earn the reward begins. For example, entities may set time parameters as to how long users have to fulfil requirements to earn the reward. A geo location boundary may be set up around the merchant location and/or other location determining features may be used that allow the transit system to recognize the user's mobile device enters or leaves the boundary of the entity. Other mechanisms may utilize wireless technologies such as near field communication (NFC), radio frequency identification (RFID), Bluetooth low energy (BLE), and/or the like to create and recognize entrance to a boundary. As just one example, if the user accepts the reward from Selfridges, a boundary around the Selfridges store may become active. In some embodiments, the user further may be required to enter/cross the boundary within a designated timeframe, such as within two hours from acceptance of the reward. Failure to do so will result in forfeiture of the reward. If the user does cross the boundary they and the entity are notified and the user earns their reward. Additional rules may be established by the entity to earn the reward such as 1) time upon which boundary must be crossed: 2) a time of day the boundary may be crossed for example between 8 am-10 am: 3) duration user must stay within the boundary, such as for ten minutes, and the like. Items may take form of transit rides and/or transit credits, coupons, merchandise, and/or other items related to an entity, and/or other incentives. The user may receive multiple items for a single product intent session that they may select and ultimately accept.

In some embodiments, a general intent session may also be invoked. The general intent session may operate similar to the product intent session, except the user may just provide an indication that he wants to visit a particular area. For example, a user may decide he wants to visit a particular area of a city for an afternoon. He may input the general destination (city, neighborhood, etc.) and see what entities are available to incentivize him to visit using public transit options.

In some embodiments, the transit system may also maintain logs of the number of intent sessions create by each user, a number of items accepted/declined and number of items ultimately won or forfeited. A score/rating will be generated for each user that is indicative of the probability to start a session and actually receive the item. The score will help entities understand optimal strategy for increasing usage of the transit system. Typically users with higher scores should also expect better item offers.

According to some embodiments, the functionality described herein may be performed by one or more computing devices (such as mobile phones, tablets, desktop computers, servers, and/or similar electronic devices), which may be connected via a wireless and/or wired technologies to data communication network, such as the Internet and/or other networks.

It will be understood, however, that alternative embodiments may have additional or alternative functions. Additionally, although the example provided herein pertains to the use of a subway to transport a transit patron to Selfridges in London, it will be readily understood that embodiments are not so limited. Embodiments may apply to other types of public transit, other destinations, and/or other cities.

Embodiments of the invention provide a number of advantages, including 1) entities offer items to entice users to travel on public transportation 2) using geo location, BLE, NFC technologies, and the like to determine when users enter intended target zones (entities) and are as such entitled to their aforementioned items, and 3) users can identify a specific intent for a visit to an area that allows item offers to be more relevant.

Figure 1:
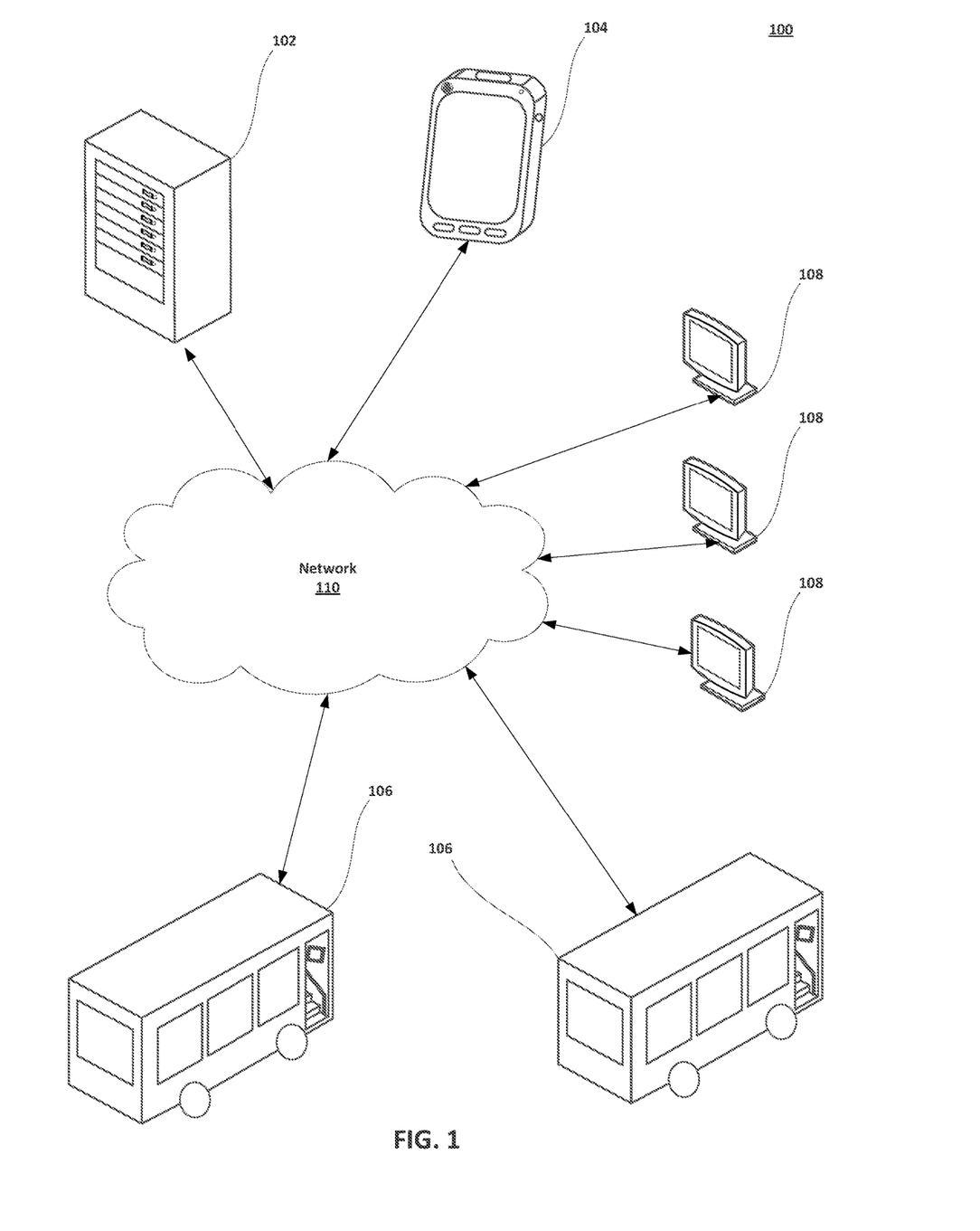
FIG. 1 depicts a system for increasing transit ridership according to embodiments.

Turning now to FIG. 1, a system 100 for increasing transit ridership is provided. System 100 includes at least one transit system 102. Transit system 102 provides ride services to the public, which helps eliminate private vehicles on the roadways. Transit system 102 may include one or more forms of mass transit, such as buses, trains, cabs, trolleys, and the like. Transit system 102 may also include, in addition to instead of the other vehicles, rideshare services. Transit system 102 may include a back office that include data processing systems. In some embodiments, the transit system may also operate a number of beacons positioned around roadways and railways that may be used to track its vehicles.

Transit system 102 may be in communication with one or more mobile devices 104. Mobile devices 104 may be mobile phones, tablet computers, laptops, personal digital assistants, e-readers, and/or any other wireless electronic devices. Users of the transit system may utilize mobile devices 104 to communicate with the transit system 102, such as by providing destination information (general or specific), receiving offers of transit ride options and other items from the transit system 102, selecting one or more items, receiving the items from the transit system 102, and/or other communications. Mobile devices 104 may also be enabled to operate as fare media that are usable to pay transit fares within the transit system 102. For example, the mobile device 104 may be configured to display a computer readable identifier associated with a purchased transit product, stored value account, and/or other transit account. This identifier, such as a barcode or QR code, may be read by a fare gate or other transit system access mechanism that may determine whether to allow the user access to the transit system. In other embodiments, the mobile device may transfer a data file that represents a transit product and/or account, such as by using an NFC interface, to the fare access mechanism to gain access to the transit system. As just one example, a user may scan a QR code at a fare access gate, which may cause a gate or other barrier to move and/or unlock to allow the user passage and/or perform some other physical state-changing activity, such as illuminating a light source, causing a speaker to emit a sound, and/or otherwise produce an indication that the user may access the transit system 102. Transit system 102 may also use location information associated with the mobile device 104 to track the whereabouts of the user of a particular mobile device 104. This tracking may be used to ensure that the user has actually utilized the transit system 102 in order to travel to the user's destination.

System 100 may also include any number of transit vehicles 106. Transit vehicles 106 may include buses, trains, cabs, rideshare vehicles, and/or any other vehicles that are utilized to transport the public. Transit vehicles 106 may include location tracking devices that allow the current location of each vehicle 106 to be tracked in real-time by the transit system 102. For example, in some embodiments, some or all transit vehicles 106 may be equipped with a global positioning satellite system (GPS) module that actively monitors a location of the particular vehicle 106. Coordinate data from the GPS module of each vehicle 106 may be communicated to the transit system. In some embodiments, one or more of the vehicles 106 may include communication modules that communicate with the beacons of the transit system 102. In some embodiments, the communication modules and/or the transit system beacons may be range limited such that each vehicle 106 is only within communication range of a small subset of the beacons positioned about the various transit routes. By determining which beacons a vehicle is in communication with, as well as by using a strength of each communication signal between the communication module and beacon, an exact location of the transit vehicle 106 may be determined at all times. In some embodiments, at least some of the transit vehicles 106 may include beacons that are configured to communicate with mobile devices 104 that are nearby the vehicle 106. This allows the vehicles 106 to determine when particular mobile devices 104 are on board the transit vehicle 106. This information may be provided to the transit system 102, which may use the information to determine whether a user has satisfied the terms of an agreement for a particular item.

System 100 may further include a number of entities 108. Entities 108 may include hotels, attractions, retail establishments, restaurants, and/or other retail, municipal establishments, both public and/or private. The entities may include any establishment or location that may be willing to offer items, such as discounted or free transit fare in exchange for a user visiting the entity via one or more transit vehicles 106. Entities 106 may be in communication with the transit system 102 in order to provide items to users who intend to visit the entity or an area nearby the entity. The entities 108 may also include one or more beacons or other proximity sensors that can detect when a particular mobile device 104 is within the entity. For example, the entity may have a Bluetooth or other wireless signal projected within the confines of the property. When a user's mobile device 104 is detected, the entity may determine that the user associated with the mobile device 104 is within a boundary of the entity. This information may be provided to the transit system 102 for use in determining whether the mobile device 104 has satisfied the requirements associated with receiving a particular item. In other embodiments, rather than or in addition to using beacons at an entity, the transit system 102 may establish a geofence at the boundary of one or more of the entities 108. The transit system 102 may then compare location data from the mobile devices 104 to the geofence data to determine when a particular user is in a particular entity.

In some embodiments, the transit system 102 may be in communication with a point of sale (POS) device of one or more entities and/or with a credit card and/or other transaction system. This allows the transit system 102 to receive data that verifies that a user had an interaction at a particular entity.

The various devices of system 100 may be in communication with one another via one or more networks 110. For example, network 110 may include one or more local area networks (LAN) and/or other wired and/or wireless networks. Network 110 may utilize one or more of Wi-Fi, ZigBee, Bluetooth™, Bluetooth™ Low Energy, a cellular communications protocol such as 3G, 4G, 5G, LTE, and/or any other wireless communications protocol. It will be appreciated that one or more different network connections may be used in accordance with the invention, and that the use of a single network 110 to enable communications is merely one example of such configurations. For example, each component may be communicatively coupled with other components using a separate network for one or more of the connections. The connections between the transit system 102, mobile devices 104, transit vehicles 106, and/or entities 108 may be secure. This may be done using encryption over a public network, a private network, a secure virtual private network (VPN), or any other method of securing a connection.

Figure 2:
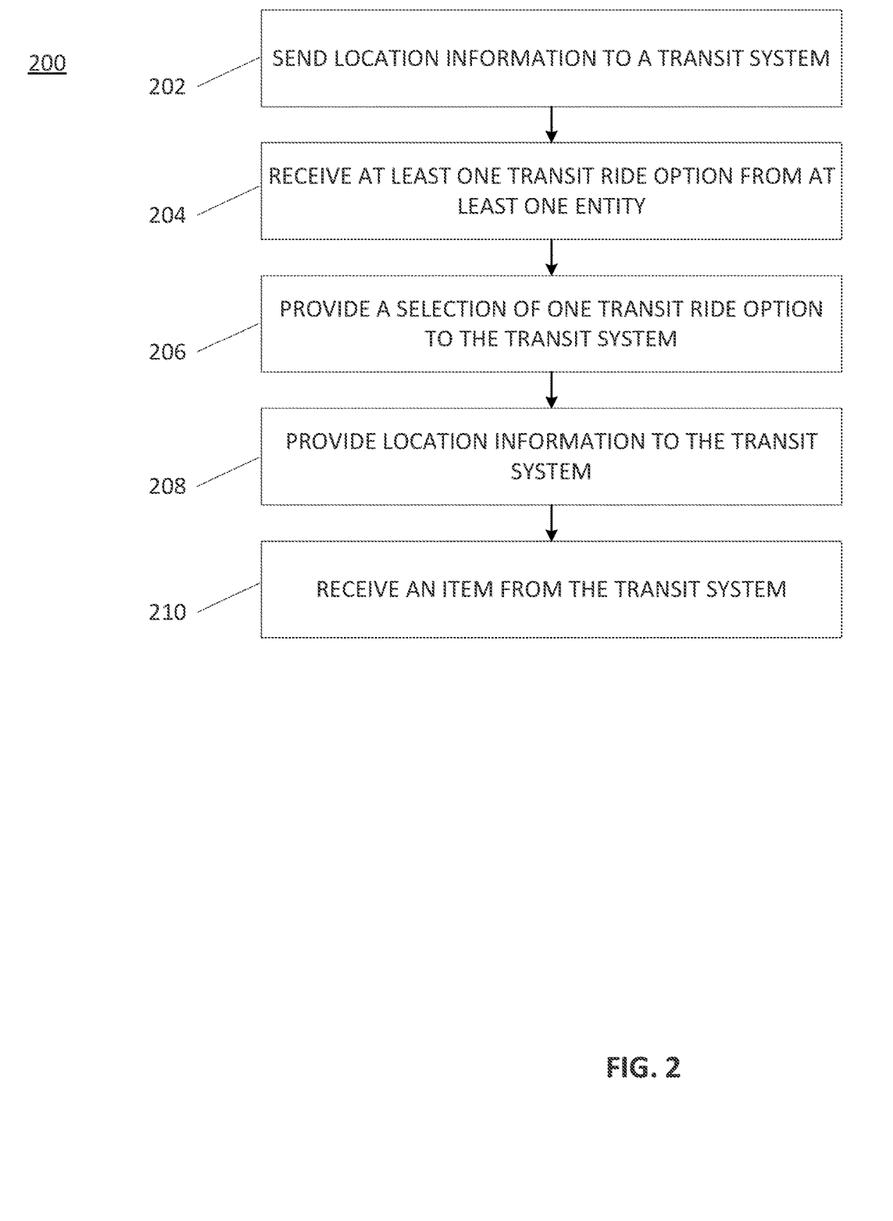
FIG. 2 is a flowchart depicting a process of invoking a general or specific intent session using a mobile device according to embodiments.

FIG. 2 depicts a flowchart for a process 200 of invoking a general or product-based intent session using a mobile device, such as mobile device 104 described above. The mobile device may have a mobile transit application downloaded onto the device. For example, the user may enroll his mobile device for use in a transit ridership enhancement program. Enrollment may include creating an account and/or linking an existing transit account to the program. Oftentimes, the enrollment will include providing personal and/or payment data to the transit system. In some embodiments, prior to, during, or after enrollment, the transit system may provide a transit mobile application to the user. This may be done by downloading the mobile application directly onto the mobile device for installation and execution thereon. In some embodiments, the transit system may cause the mobile application to be downloaded onto the mobile device directly from a transit system server, while in other embodiments the transit system may provide a link or instructions to access a link to download the mobile application from a third-party server, such as an application library.

When wanting to visit a particular area, the user may execute the mobile application to select a particular location, such as a city, neighborhood, shopping center, transit stop, and/or other area and send this information to the transit system at block 202. This may be done by the user using the application to input an address, coordinates, radius, a geofence, a boundary outlined using a touchscreen, and/or by otherwise providing a description of a destination location that is representative of a location to a computing device. In some embodiments, such as those in a product intent session, along with a destination location the mobile device may provide a reason for the trip. For example, the user of the mobile device may wish to purchase a television. This reasoning may be input into the mobile device and provided to the transit system so that the transit system can determine the intent of the user of the mobile device. In some embodiments, the user may also input a desired time and/or date range of the visit for transmission to the transit system.

The location information, intent, and/or time and/or date range may be relayed by the transit system to one or more entities that are within a predetermined radius of the location selected by the user. In some embodiments, this radius may be a default radius selected by the transit system, while in other embodiments, the transit system may use a dynamic radius algorithm that is based on factors such as ease of public transit access to a particular location, a geographic and/or population size of an area, and/or other factors. In yet other embodiments, the transit system may cause the mobile transit application to prompt the user of the mobile device for a radius selection such that the user can determine how big an area in which the transit system should search for possible entities. The entities identified by the transit system may be alerted of the user's upcoming trip, intent, and/or desired timeframe and may provide one or more transit ride options, which may be provided to the mobile device for presentation on the screen of the mobile device by the transit system at block 204. In some embodiments, some or all of the entities may provide additional incentives to the user of the mobile device. For example, a free produce, discount, and/or other incentive (which may or may not be associated with the intent) may be provided to the user in addition to the transit ride option.

The user may select a preferred one of the transit ride options, which is then sent to the transit system at block 206. This selection may be based on a preferred entity, a cheapest ride, most efficient path, available time, and/or other factors and combinations thereof. The user may then take a transit vehicle to the entity associated with the selected transit ride option. To prove that the user utilized the selected ride option to travel to the entity, the mobile device may provide location information to the transit system at block 208. This information may be compared to known locations of transit vehicles and a location of the entity to prove that the mobile device and user were there. In some embodiments, the mobile device may also be configured to communicate with one or more beacons of the transit vehicle and/or the entity. This allows the beacons to detect the presence of the mobile device. In embodiments where the mobile device is usable as a transit fare media, interactions with the access control devices of the transit system may be analyzed to determine whether the mobile device was used to access the transit system.

Upon verification that the mobile device was transported to the entity on a transit vehicle in accordance with the selected transit ride option, the mobile device may receive an item at block 210, such as a transit ride product, credit, and/or other incentive. Such items help to increase transit ridership.

Figure 3:
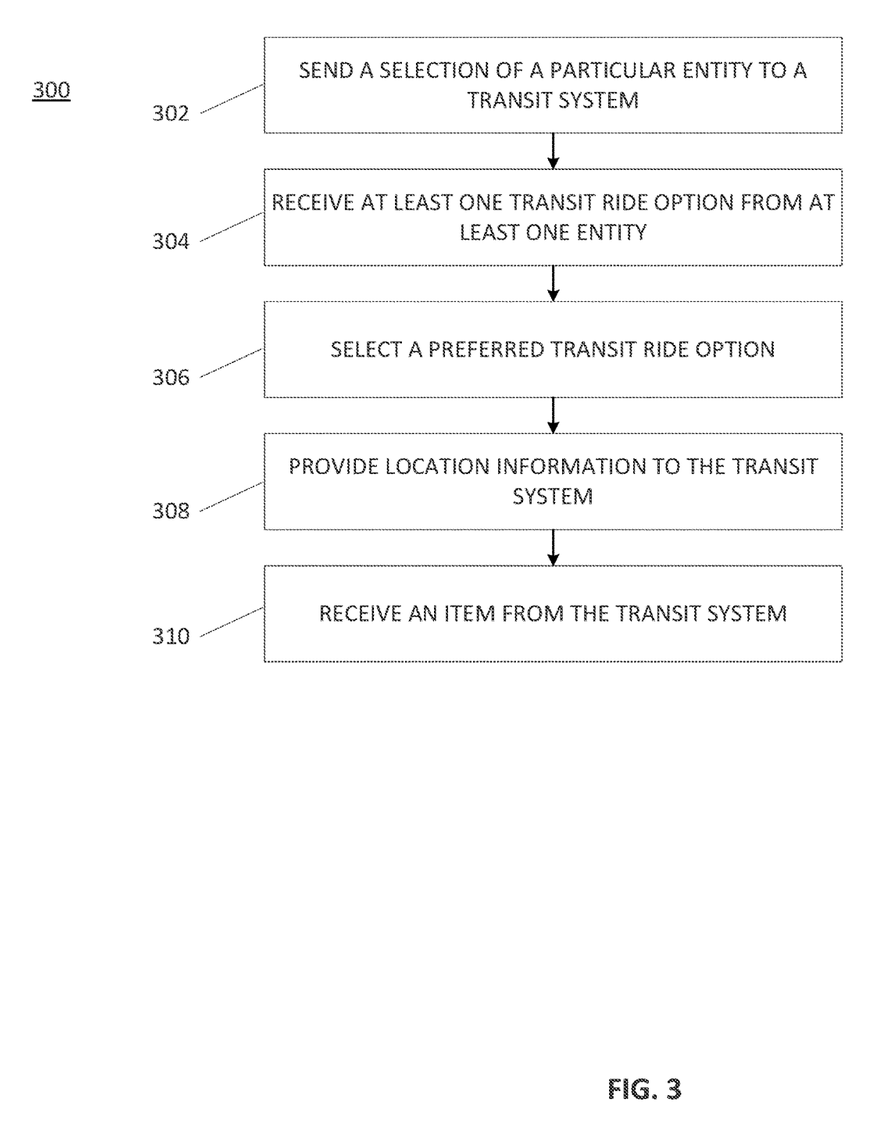
FIG. 3 is a flowchart depicting a process of invoking an entity specific intent session using a mobile device according to embodiments.

FIG. 3 depicts a flowchart for a process 300 of invoking an entity intent session using a mobile device, such as mobile device 104 described above. Process 300 may include the enrollment, download, and/or installation of a mobile transit application as described in relation to FIG. 2. When wanting to visit a particular entity, the user may execute the mobile application to select a particular entity and send this selection to the transit system at block 302. In some embodiments, along with an entity selection the mobile device may provide a reason for the trip. For example, the user of the mobile device may wish to purchase a television. This reasoning may be input into the mobile device and provided to the transit system so that the transit system can determine the intent of the user of the mobile device. In some embodiments, the user may also input a desired time and/or date range of the visit for transmission to the transit system.

The location information, intent, time and/or date range may be relayed by the transit system to the selected entity. The selected entity may provide one or more transit ride options, which may be provided to the mobile device for presentation on the screen of the mobile device by the transit system at block 304. In some embodiments, the selected entity may provide additional incentives to the user of the mobile device. For example, a free product, discount, and/or other incentive (which may or may not be associated with the intent) may be provided to the user in addition to the transit ride option. For example, the entity may offer a discount on any television, a particular brand of television, and/or a specific television.

The user may select a preferred one of the transit ride options, which is then sent to the transit system at block 306. This selection may be based on a cheapest ride, most efficient path, available time, and/or other factors and combinations thereof. The user may then take a transit vehicle to the entity associated with the selected transit ride option. To prove that the user utilized the selected ride option to travel to the entity, the mobile device may provide location information to the transit system at block 308. This information may be compared to known locations of transit vehicles and a location of the entity to prove that the mobile device and user were there. In some embodiments, the mobile device may also be configured to communicate with one or more beacons of the transit vehicle and/or the entity. This allows the beacons to detect the presence of the mobile device. In embodiments where the mobile device is usable as a transit fare media, interactions with the access control devices of the transit system may be analyzed to determine whether the mobile device was used to access the transit system.

Upon verification that the mobile device was transported to the entity on a transit vehicle in accordance with the selected transit ride option, the mobile device may receive an item at block 310, such as a transit ride product, credit, and/or other incentive. Such items help to increase transit ridership.

Figure 4:
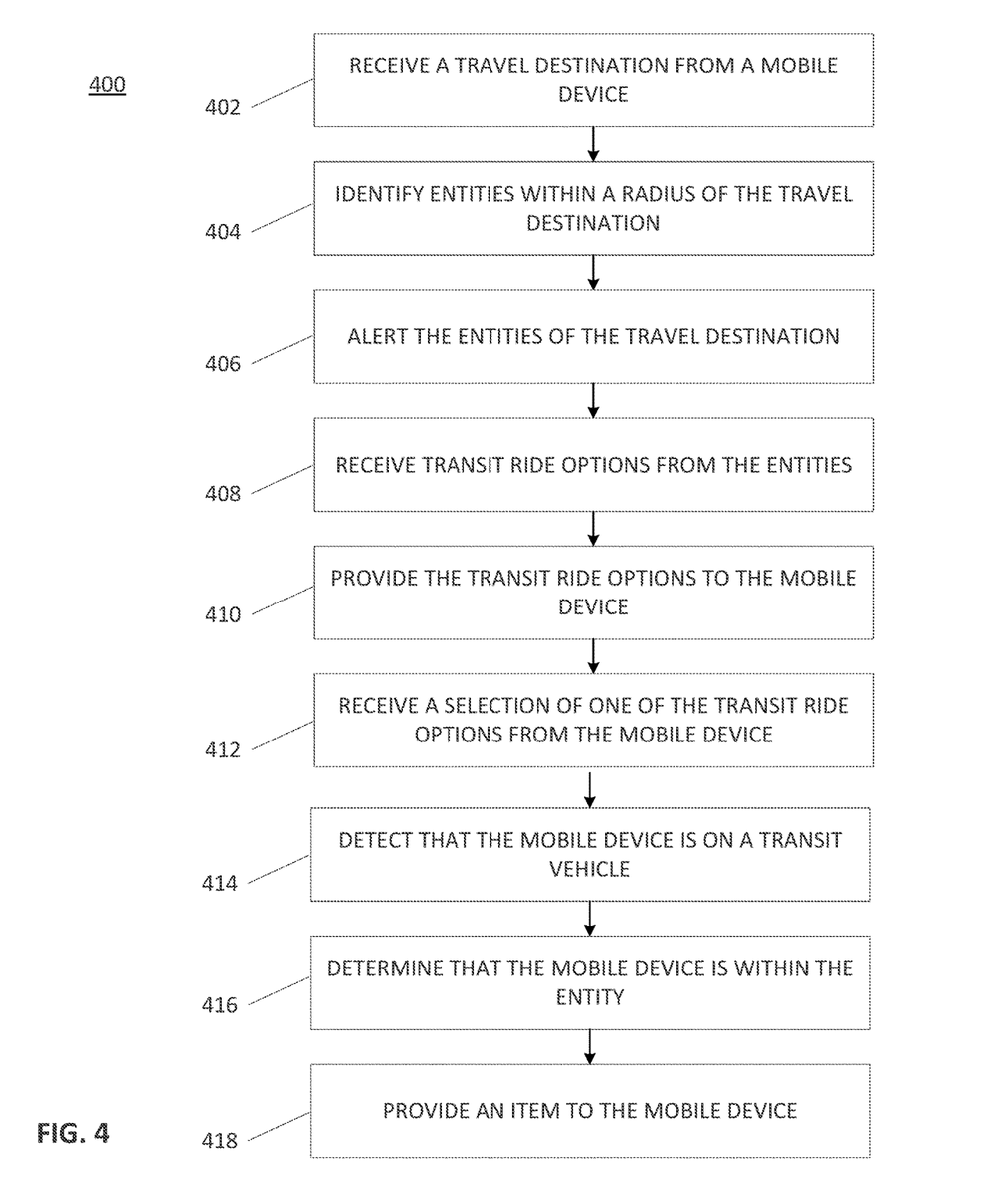
FIG. 4 is a flowchart depicting a process for increasing transit ridership according to embodiments.

FIG. 4 depicts a flowchart for a process 400 of increasing transit ridership. Process 400 may be performed by a transit system, such as transit system 102 described above. Process 400 may be related to the invocation of a product or general intent session by a mobile device, such as process 200 that may be performed by a mobile device such as mobile device 104. Process 400 may begin at block 402 by receiving a travel destination from a mobile device. For example, the transit system may provide a transit mobile application to the mobile device for execution thereon. As just one example, the user may enroll his mobile device for use in a transit ridership enhancement program. Enrollment may include creating an account and/or linking an existing transit account to the program. Oftentimes, the enrollment will include providing personal and/or payment data to the transit system. In some embodiments, prior to, during, or after enrollment, the transit system may provide a transit mobile application to the user. This may be done by downloading the mobile application directly onto the mobile device for installation and execution thereon. In some embodiments, the transit system may cause the mobile application to be downloaded onto the mobile device directly from a transit system server, while in other embodiments the transit system may provide a link or instructions to access a link to download the mobile application from a third-party server, such as an application library. When wanting to visit a particular area, the user may execute the mobile application to select a particular location, such as a city, neighborhood, shopping center, transit stop, and/or other area. This may be done by the user using the application to input an address, coordinates, radius, a geofence, a boundary outlined using a touchscreen, and/or by otherwise providing a description of a destination location that is representative of a location to a computing device. In some embodiments, such as those in a product intent session, along with a destination location the mobile device may provide a reason for the trip. For example, the user of the mobile device may wish to purchase a television. This reasoning may be input into the mobile device and provided to the transit system so that the transit system can determine the intent of the user of the mobile device.

The travel destination may be received by the transit server and used to identify a plurality of entities positioned within a predefined radius of the travel destination at block 404. For example, the transit system may identify any number of entities, such as restaurants, merchants, attractions, events, and the like within a 1 mile radius of the travel destination by using address and/or coordinate data associated with each entity. In some embodiments, during a product intent session, the entities that are identified may be selected based on the entities matching all or part of the intent of the user. For example, if the intent is to purchase a television, some or all of the entities identified may be selected due to the entities offering televisions for sale. It will be appreciated that numerous other intents may be possible and that identified entities may or may not be directly related to the intent of the user. Once the entities have been identified, each of the entities may be alerted that the mobile device has selected the transit destination at block 406. For example, the transit system may send a message to a computing device of each entity. The entities may analyze each alert they receive and determine to offer a transit ride option to the user of the mobile device. The transit ride option may involve the use of at least one transit vehicle to travel to the entity. In some embodiments, the transit ride option may include a full or partial list of directions from the current location of the mobile device to the entity using at least one vehicle operated by the transit system. The directions may be fairly generic and just state that the user should take the A train to Union Station and/or may be more specific and include departure and/or arrival times and one or more available train (or other transit vehicle) designations that allows a user to readily plan their trip without needing to research transit options on their own. For example, in some embodiments the directions may indicate that the user should board the 11:10 A train at Union Station, get off at Broadway Station and transfer to the 11:32 C bus to the bus stop at 210 Main Street. In some embodiments, the transit ride option(s) may include a single transit ride, such as a particular bus that travels the entire path between the current location of the mobile device and the entity. In embodiments where a substantial length of the travel is provided by one or more transit vehicles, walking directions may also be provided. In other embodiments, multiple vehicles and/or types of vehicles may be provided. As just one example, the transit ride option may provide directions indicating that the user should take one or more buses and a light rail to get to a particular entity. In some embodiments, a single entity may provide multiple transit ride options, providing the user of the mobile device with options on how they would like to travel.

In order to encourage the user of the mobile device to use the transit system to visit, the entities may offer to pay for some or all of the transit rides necessary to travel to the entity. For example, the entities may provide a travel voucher to partially or entirely cover the costs of each transit ride option. The terms of such an offer may be outlined in the transit ride option itself. As just one example, the transit ride option may include directions to take one or more transit vehicles to travel to an entity. The transit ride option may also outline how much of the transit ride the entity will pay for. In some embodiments, the entity may also designate additional rules for receiving the transit ride option and/or payment, which may be outlined in the transit ride option. For example, the entity may require the user to visit the entity within a particular time threshold, such as before 6 pm, during happy hour, during a particularly slow business period, or the like. The entity may also require the user to visit the entity for a particular amount of time in order to get the payment. For example, the entity may require the user to spend at least 15 minutes (or any other designated timeframe) within the entity.

In some embodiments, additional incentives may be offered to the user of the mobile device. For example, one or more entities may offer a discount, free item, and/or other incentive to encourage the user to select a particular entity to visit. In some embodiments, the additional incentive may be offered along with, as part of, and/or instead of the transit ride option. In other embodiments, an offer of an additional incentive may occur at a different time.

At least some of the entities may send one or more transit ride options to the transit system at block 408. The transit system may then relay or otherwise provide the transit ride option(s) to the mobile device, such as by causing the option(s) to be presented on a display of the mobile device at block 410. The user may then review all available transit ride options (and possibly additional incentives) and select a desired one of the transit ride options. This selection may be received by the transit system at block 412. In some embodiments, the entity associated with the selected transit ride option and/or other incentive may be provided with a notification that the user selected their transit ride option and/or other incentive.

At block 414, the transit system may detect that the mobile device is present on a transit vehicle associated with the transit ride option. This may be done, for example, by detecting that the mobile device was used as a fare media to access the transit system and/or a transit vehicle. In other embodiments, the transit vehicle and/or transit system (such as at a transit station or stop) may include one or more beacons (such as, but not limited to, Bluetooth communications devices) that are configured to communicate with mobile devices. When one or more of the beacons has detected the presence of a particular mobile device, the information may be provided to and/or used by the transit system to determine whether the user and the mobile device are present on a transit vehicle. For example, each transit vehicle may have one or more beacons that are configured to project a signal only to the boundaries of the vehicle such that any device detected within the signal must be present on the vehicle. In other embodiments, the transit system may utilize location data from both the mobile device and the transit vehicles to determine whether the mobile device and user are present on the vehicle. For example, GPS and/or other location data may be provided to the transit system by the mobile device. Similarly, in some embodiments, the transit vehicle may provide GPS location data to the transit system. The locations of the two devices may be compared by the transit system, oftentimes at two or more different points of time, to determine whether the mobile device is travelling along with (and on) the transit vehicle. In some embodiments, rather than (or in addition to) using GPS data from the transit vehicle, the transit system may track its transit vehicles using beacons that are spaced apart along a length of a transit route. The beacons may be configured to wirelessly communicate with communications systems of the transit vehicle. One or both of these transit system beacons or the vehicle communications system may be range limited such that the vehicles may only communicate with one or a small subset of beacons at any one time. Based on which beacons are detecting the vehicle, as well as a strength of each signal detected from the vehicle, the transit system may determine a location of the transit vehicle. It will be appreciated that any combination of the above or other location detection techniques, location data, location comparisons, and/or other determinations of whether a user is on board a transit vehicle may be utilized by the transit system to determine whether the user of the mobile device is entitled to the transit ride option. The detection data may also include time data, such as timestamps, that allow the transit system to determine exactly when and for what duration a mobile device was on the transit vehicle.

In some embodiments, where a particular vehicle or mode of transit is required by the transit ride option offered by an entity, the transit system may receive an identifier from the vehicle used by the mobile device. This allows the transit system to verify that the vehicle is of the correct type of transit vehicle and/or is a specific vehicle required by the entity, such as a particular hotel or casino shuttle.

At block 416, a determination may be made as to whether the mobile device is present within an entity associated with the selected one transit ride option. This determination may be made after the user has been detected on the transit vehicle and may be performed in a number of ways. For example, the transit system may establish a geofence at or proximate the boundary of the entity associated with the selected transit ride option. The transit system can then compare location information from the mobile device with the coordinates of the geofence area to determine whether the user has visited the entity. In other embodiments, the entity may include one or more wireless beacons that may be used to detect the presence of the mobile device. For example, a Wi-Fi, NFC, Bluetooth, and/or other wireless module(s) may be positioned at the entity to detect when the mobile device is present. In some embodiments, the wireless module(s) may be restricted to only produce signals that reach to the boundary of the entity such that the detection of a mobile device means the mobile device is present at the entity. In some embodiments, combinations of GPS data and beacon communications may be used to determine whether a user and mobile device have been at a store. These detections may include time data, such as timestamps that allow the transit system to determine exactly when and for how long the user visited a particular entity.

In some embodiments, the transit system may be in communication with some of the computer system of one or more of the entities. For example, the transit system may be configured to interface with a POS system of the entity. This allows the entity to easily notify the transit system every time the user and/or mobile device has an interaction with the POS system. In some embodiments, the transit system may be in communication with a financial institution, such as a bank or credit/debit card issuer. These financial institutions may provide information to the transit system that indicates that a user associated with the mobile device visited the particular entity. The information from the POS system and/or the financial institution may include time data that allows the transit system to determine when the user visited the entity.

At least one item may be provided to the user and/or to the mobile device based on the determination that the user has visited the entity at block 418. The item may include a voucher for all or part of the selected transit ride option, a coupon, credit or other discount for the transit system, and/or other item related to the selected transit ride. Oftentimes, the item will be provided to a transit account associated with mobile device and/or provided to the mobile device itself, such as through the mobile transit application. However, in some embodiments, the transit system may send a physical item to the user. In some embodiments, the at least one item may include one or more additional incentives, such as those described above that may be related to discounts and/or free items provided by the entity. Oftentimes, these items are provided after it is confirmed that the user has both used the transit vehicle(s) specified in the selected transit ride option and has visited the entity associated with the selection, as well as meeting any further criteria for the item(s). By doing so, the transit system can ensure that the item is being provided in exchange for increasing ridership on public and shared transit systems, thereby reducing both the usage of private modes of transportation and the problems associated with private modes of transportation such as congestion, $CO_2$ emissions, parking infrastructure, and the like.

Figure 5:
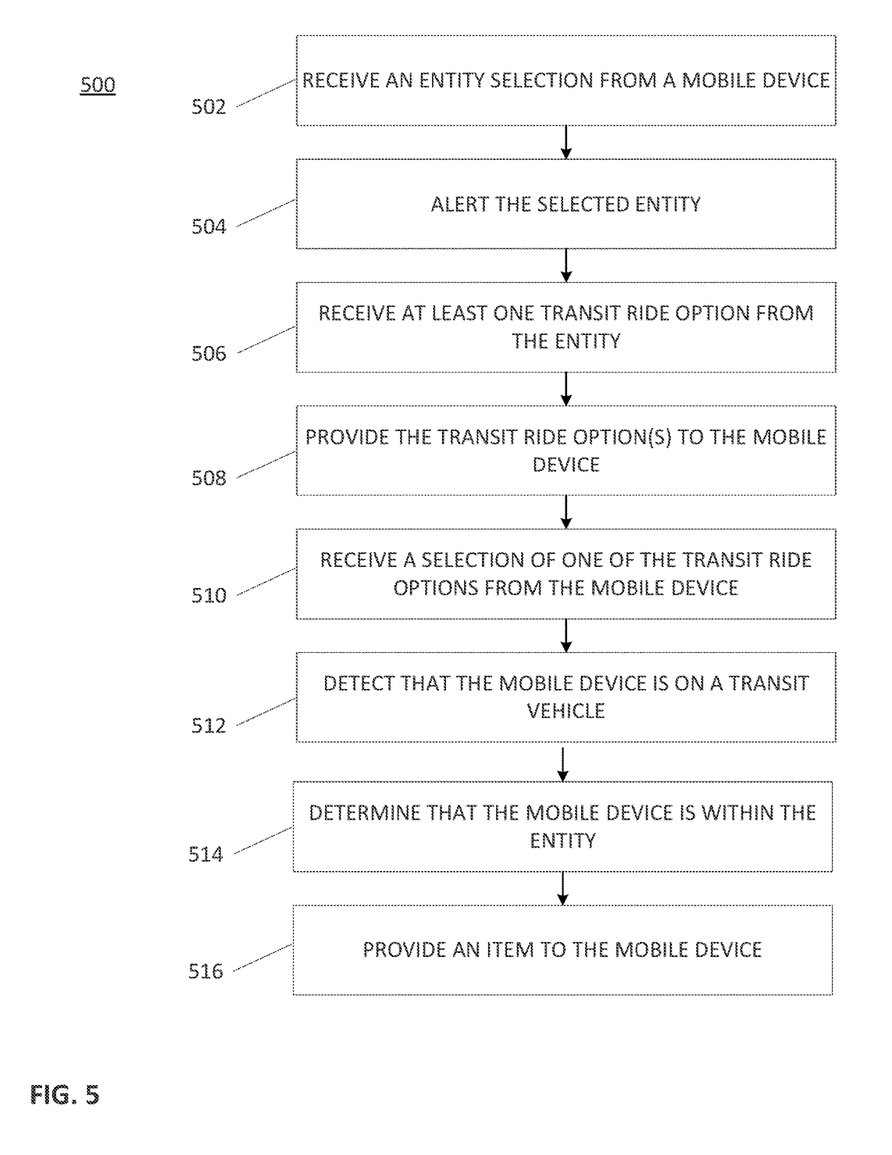
FIG. 5 is a flowchart depicting a process for increasing transit ridership according to embodiments.

FIG. 5 depicts a flowchart for a process 500 of increasing transit ridership. Process 500 may be performed by a transit system, such as transit system 102 described above. Process 500 may be related to the invocation of an entity intent session by a mobile device, such as process 300 that may be performed by a mobile device such as mobile device 104. Process 500 may begin at block 502 by receive a destination location from a mobile device the destination location comprising an entity. For example, a user of the mobile device may use a mobile transit application (similar to that described above) to input and send a destination location to the transit system may provide a transit mobile application to the mobile device for execution thereon. The destination location may be selected from a list of participating entities and/or a name and/or address of a particular entity may be input into the mobile application. In some embodiments, an entity may be selected on a map displayed by the mobile device using the mobile application. In some embodiments, the mobile device may provide a reason for the trip. For example, the user of the mobile device may wish to purchase a television from the selected entity. This reasoning may be input into the mobile device and provided to the transit system so that the transit system can determine the intent of the user of the mobile device.

The destination location may be received by the transit server, which then alerts the entity that the entity has been selected by the mobile device at block 504. In embodiments where the user has indicated an intent for the trip, the intent may be provided to the entity for use in determining what, if any, transit ride options or other incentives to offer. At block 506, the transit system may receive, in response to the alert, at least one transit ride option from the entity, which may be based on the intent, the user, and/or other factors. The transit ride option(s) may involve the use of at least one transit vehicle to travel to the entity. In some embodiments, the transit ride option may include a full or partial list of directions from the current location of the mobile device to the entity using at least one vehicle operated by the transit system as described in relation to FIG. 4.

In order to encourage the user of the mobile device to use the transit system to visit, the entities may offer to pay for some or all of the transit rides necessary to travel to the entity. For example, the entities may provide a travel voucher to partially or entirely cover the costs of each transit ride option. The terms of such an offer may be outlined in the transit ride option itself. As just one example, the transit ride option may include directions to take one or more transit vehicles to travel to an entity. The transit ride option may also outline how much of the transit ride the entity will pay for. In some embodiments, the entity may also designate additional rules for receiving the transit ride option and/or payment, which may be outlined in the transit ride option. For example, the entity may require the user to visit the entity within a particular time threshold, such as before 6 pm, during happy hour, during a particularly slow business period, or the like. The entity may also require the user to visit the entity for a particular amount of time in order to get the payment. For example, the entity may require the user to spend at least 15 minutes (or any other designated timeframe) within the entity.

In some embodiments, additional incentives may be offered to the user of the mobile device. For example, the entity may offer a discount, free item, and/or other incentive (which may or may not be related to any intent provided by the user) to encourage the user to utilize the transit system on a particular visit. In some embodiments, the additional incentive may be offered along with, as part of, and/or instead of the transit ride option. In other embodiments, an offer of an additional incentive may occur at a different time.

The transit system may then relay or otherwise provide the transit ride option(s) to the mobile device, such as by causing the option(s) to be presented on a display of the mobile device at block 508. The user may then review all available transit ride options (and possibly additional incentives) and select a desired one of the transit ride options. This selection may be received by the transit system at block 510. In some embodiments, the entity associated with the selected transit ride option and/or other incentive may be provided with a notification that the user selected their transit ride option and/or other incentive.

At block 512, the transit system may detect that the mobile device is present on a transit vehicle associated with the transit ride option. This may be done, for example, by detecting that the mobile device was used as a fare media to access the transit system and/or a transit vehicle, using beacons, location data from the mobile device and/or a transit vehicle, combinations thereof, and/or other methods as discussed in conjunction with FIG. 4. In some embodiments, where a particular vehicle or mode of transit is require by the transit ride option offered by an entity, the transit system may receive an identifier from the vehicle used by the mobile device. This allows the transit device to verify that the vehicle is of the correct type of transit vehicle and/or is a specific vehicle required by the entity, such as a particular hotel or casino shuttle.

At block 514, a determination may be made as to whether the mobile device is present within an entity associated with the selected one transit ride option. This determination may be made after the user has been detected on the transit vehicle and may be performed in a number of ways. For example, the transit system may use geofences, location data of the mobile device, beacons, combinations thereof, and/or other techniques as described in conjunction with FIG. 4. Time data may be used by the transit system to determine exactly when and for how long the user visited a particular entity.

In some embodiments, the transit system may be in communication with some of the computer system of one or more of the entities. For example, the transit system may be configured to interface with a POS system of the entity. This allows the entity to easily notify the transit system every time the user and/or mobile device has an interaction with the POS system. In some embodiments, the transit system may be in communication with a financial institution, such as a bank or credit/debit card issuer. These financial institutions may provide information to the transit system that indicates that a user associated with the mobile device visited the particular entity. The information from the POS system and/or the financial institution may include time data that allows the transit system to determine when the user visited the entity.

At least one item may be provided to the user and/or to the mobile device based on the determination that the user has visited the entity at block 516. The item may include a voucher for all or part of the selected transit ride option, a coupon, credit or other discount for the transit system, and/or other item related to the selected transit ride. Oftentimes, the item will be provided to a transit account associated with mobile device and/or provided to the mobile device itself, such as through the mobile transit application. However, in some embodiments, the transit system may send a physical item to the user. In some embodiments, the at least one item may include one or more additional incentives, such as those described above that may be related to discounts and/or free items provided by the entity. Oftentimes, these items are provided after it is confirmed that the user has both used the transit vehicle(s) specified in the selected transit ride option and has visited the entity associated with the selection, as well as meeting any further criteria for the item(s). By doing so, the transit system can ensure that the item is being provided in exchange for increasing ridership on public and shared transit systems, thereby reducing both the usage of private modes of transportation and the problems associated with private modes of transportation such as congestion, $CO_2$ emissions, parking infrastructure, and the like.

It will be appreciated that in both process 400 and 500, the transit system may collect data related to the various transit ride options that are offered, accepted, and/or successfully earned and redeemed, and/or data associated with purchases made at the various entities. This data may be used to generate scores or ratings associated with each user of the system. These ratings may be provided to the various entities and used by the transit system and/or the entities to determine which transit ride options and/or other incentives not only are most successful at increasing transit ridership, but already generate benefits for the entities themselves. This allows the various entities to optimize their offer strategy. Data associated with interactions and purchases of the user may be provided to the transit system in real-time or in batches at predetermined intervals, such as at the end of the day.

It will be appreciated that with the various processes described herein, some functions may be attributable to other systems/devices. For example, some of the data shared by the mobile device and/or entity may be provided directly to the other system, without being received and/or relayed by the transit system.

In some embodiments, the transit ride options and/or incentives may be adjusted based on the usage of the mobile device. For example, the provision of any incentives may be tiered based on the user meeting certain requirements. As just one example, the transit ride option may be paid upon detection of the mobile device being on the transit vehicle, a second incentive may be provided upon detecting the mobile device being within the entity, and a third incentive may be provided upon the user making a purchase at the entity.

Figure 6:
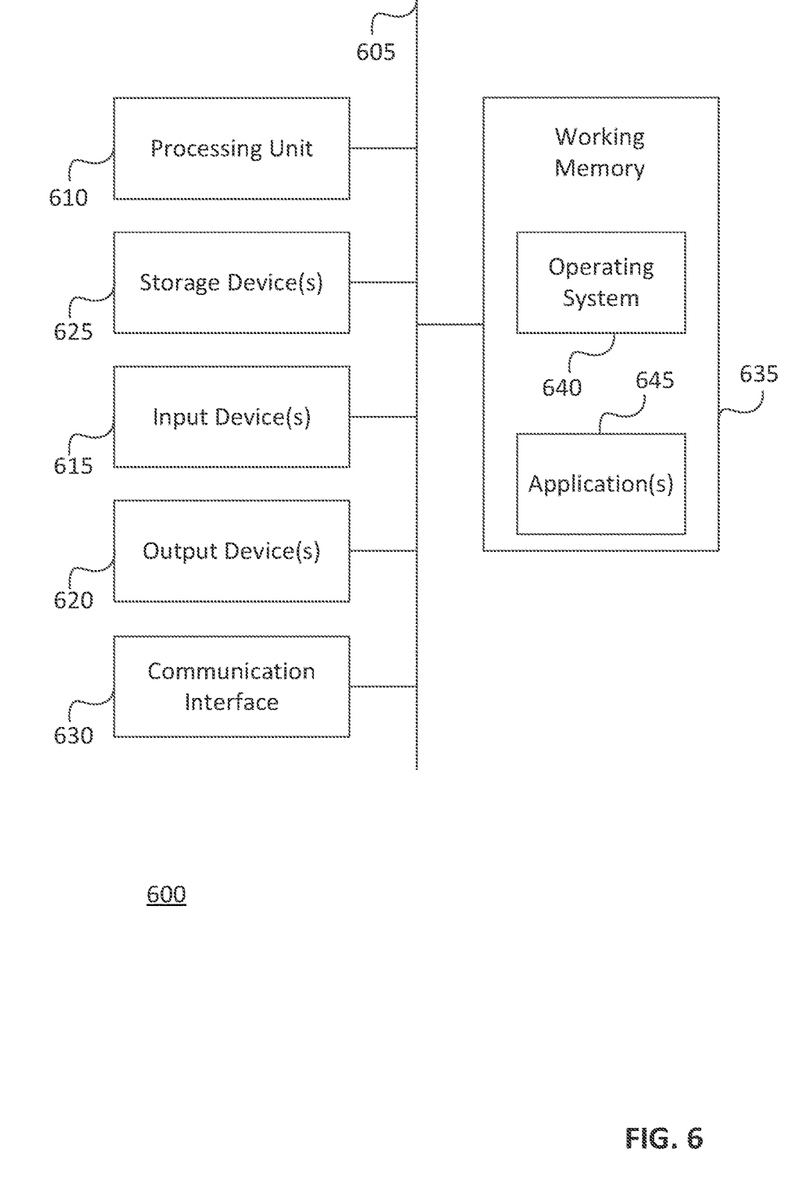
FIG. 6 is a block diagram of an example computing system according to embodiments.

A computer system as illustrated in FIG. 6 may be incorporated as part of the previously described computerized devices. For example, computer system 600 can represent some of the components of the transit system 102, mobile devices 104, transit vehicles 106, entities 108, and the like described herein. FIG. 6 provides a schematic illustration of one embodiment of a computer system 600 that can perform the methods provided by various other embodiments, as described herein. FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements may include a processing unit 610, including without limitation one or more processors, such as one or more special-purpose processors (such as digital signal processing chips, graphics acceleration processors, and/or the like); one or more input devices 615, which can include without limitation a keyboard, a touchscreen, a receiver, a motion sensor, a camera, a smartcard reader, a contactless media reader, and/or the like; and one or more output devices 620, which can include without limitation a display device, a speaker, a printer, a writing module, and/or the like.

The computer system 600 may further include (and/or be in communication with) one or more non-transitory storage devices 625, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 600 might also include a communication interface 630, which can include without limitation a modem, a network card (wireless or wired), an infrared communication device, a wireless communication device and/or chipset (such as a Bluetooth™ device, an 502.11 device, a Wi-Fi device, a WiMAX device, an NFC device, cellular communication facilities, etc.), and/or similar communication interfaces. The communication interface 630 may permit data to be exchanged with a network (such as the network described below, to name one example), other computer systems, and/or any other devices described herein. In many embodiments, the computer system 600 will further comprise a non-transitory working memory 635, which can include a RAM or ROM device, as described above.

The computer system 600 also can comprise software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such special/specific purpose code and/or instructions can be used to configure and/or adapt a computing device to a special purpose computer that is configured to perform one or more operations in accordance with the described methods.

A set of these instructions and/or code might be stored on a computer-readable storage medium, such as the storage device(s) 625 described above. In some cases, the storage medium might be incorporated within a computer system, such as computer system 600. In other embodiments, the storage medium might be separate from a computer system (e.g., a removable medium, such as a compact disc), and/or provided in an installation package, such that the storage medium can be used to program, configure and/or adapt a special purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, a risk management engine configured to provide some or all of the features described herein relating to the risk profiling and/or distribution can comprise hardware and/or software that is specialized (e.g., an application-specific integrated circuit (ASIC), a software method, etc.) or generic (e.g., processing unit 610, applications 645, etc.) Further, connection to other computing devices such as network input/output devices may be employed.

Some embodiments may employ a computer system (such as the computer system 600) to perform methods in accordance with the disclosure. For example, some or all of the procedures of the described methods may be performed by the computer system 600 in response to processing unit 610 executing one or more sequences of one or more instructions (which might be incorporated into the operating system 640 and/or other code, such as an application program 645) contained in the working memory 635. Such instructions may be read into the working memory 635 from another computer-readable medium, such as one or more of the storage device(s) 625. Merely by way of example, execution of the sequences of instructions contained in the working memory 635 might cause the processing unit 610 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 600, various computer-readable media might be involved in providing instructions/code to processing unit 610 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 625. Volatile media include, without limitation, dynamic memory, such as the working memory 635. Transmission media include, without limitation, coaxial cables, copper wire, and fiber optics, including the wires that comprise the bus 605, as well as the various components of the communication interface 630 (and/or the media by which the communication interface 630 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a magnetic medium, optical medium, or any other physical medium with patterns of holes, a RAM, a PROM, EPROM, a FLASH-EPROM, any other memory chip or cartridge, a carrier wave as described hereinafter, or any other medium from which a computer can read instructions and/or code.

The communication interface 630 (and/or components thereof) generally will receive the signals, and the bus 605 then might carry the signals (and/or the data, instructions, etc. carried by the signals) to the working memory 635, from which the processor(s) 605 retrieves and executes the instructions. The instructions received by the working memory 635 may optionally be stored on a non-transitory storage device 625 either before or after execution by the processing unit 610.

The methods, systems, and devices discussed above are examples. Some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It should be noted that the systems and devices discussed above are intended merely to be examples. It must be stressed that various embodiments may omit, substitute, or add various procedures or components as appropriate. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known structures and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A method of increasing transit ridership, the method comprising:
   receiving a travel destination from a mobile device;

identifying a plurality of entities positioned within a predefined radius of the travel destination;
alerting the plurality of entities that the mobile device has selected the travel destination;
receiving, in response to the alert, at least one transit ride option from at least some of the plurality of entities;
providing the at least one transit ride option to the mobile device;
receiving a selection of one transit ride option of the at least one transit ride option from the mobile device;
detecting that the mobile device is present on a transit vehicle associated with the transit ride option by at least one of:
  detecting the mobile device using a beacon of the transit vehicle;
  receiving location data from the mobile device and comparing the location data to a current location of the transit vehicle; or
  detecting the mobile device using a short range radio communications device of the transit vehicle;
determining that the mobile device is present within an entity associated with the selected one transit ride option by at least one of:
  detecting the mobile device using a beacon of the entity;
  receiving location data from the mobile device and comparing the location data to a current location of the entity;
  establishing a geofence around the entity associated with the selected one transit ride option and receiving location information from the mobile device, wherein determining that the mobile device is present within the entity associated with the selected one transit ride option comprises determining that the location information is within the geofence; or
  detecting the mobile device using a short range radio communications device of the entity; and
providing at least one item to the mobile device for presentation to one or both of a transit system or the entity associated with the selected one transit ride option based on the determination.

2. The method of increasing transit ridership of claim 1, wherein:
the selected one transit ride option comprises an expiration threshold; and
the item is provided to the mobile device based upon the determination that the mobile device is present within the entity associated with the selected one transit ride option within the expiration threshold.

3. The method of increasing transit ridership of claim 1, further comprising:
providing an incentive related to the entity associated with the selected one transit ride option to the mobile device.

4. The method of increasing transit ridership of claim 3, wherein:
wherein the incentive is provided to the mobile device upon determining that the mobile device is present within the entity associated with the selected one transit ride option.

5. A system for increasing transit ridership, the system comprising:
a communications interface;
a processing unit;
a memory having instructions stored thereon that cause the processing unit to:
  receive, using the communications interface, a travel destination from a mobile device;
  identify a plurality of entities positioned within a predefined radius of the travel destination;
  alert, using the communications interface, the plurality of entities that the mobile device has selected the travel destination;
  receive, in response to the alert using the communications interface, at least one transit ride option from at least some of the plurality of entities;
  provide, using the communications interface, the at least one transit ride option to the mobile device;
  receive, using the communications interface, a selection of one transit ride option of the at least one transit ride option from the mobile device;
  detect that the mobile device is present on a transit vehicle associated with the transit ride option by at least one of:
    detecting the mobile device using a beacon of the transit vehicle;
    receiving location data from the mobile device and comparing the location data to a current location of the transit vehicle; or
    detecting the mobile device using a short range radio communications device of the transit vehicle;
  determine that the mobile device is present within an entity associated with the selected one transit ride option by at least one of:
    detecting the mobile device using a beacon of the entity;
    receiving location data from the mobile device and comparing the location data to a current location of the entity;
    establishing a geofence around the entity associated with the selected one transit ride option and receiving location information from the mobile device, wherein determining that the mobile device is present within the entity associated with the selected one transit ride option comprises determining that the location information is within the geofence; or
  detecting the mobile device using a short range radio communications device of the entity; and
  provide at least one item to the mobile device for presentation to one or both of a transit system or the entity associated with the selected one transit ride option based on the determination.

6. The system for increasing transit ridership of claim 5, wherein:
the memory further comprises instructions that cause the processing unit to receive transaction data associated with a transaction at the entity associated with the selected one transit ride option, wherein determining that the mobile device is present within the entity associated with the selected one transit ride option is further based on the received transaction data.

7. The system for increasing transit ridership of claim 5, wherein:
item causes one or both of a computer readable identifier to be displayed on the mobile device for presentation at a point of sale device of the entity associated with the selected one transit ride option or a data file to be transmitted by the mobile device to the point of sale device.

8. The system for increasing transit ridership of claim 5, wherein:
the memory further comprises instructions that cause the processing unit to determine an intent of a user of the mobile device, the intent being associated with a reason that the user submitted the travel destination.

9. The system for increasing transit ridership of claim 5, wherein:

the memory further comprises instructions that cause the processing unit to notify the entity associated with the selected one transit ride option that the mobile device is present within the entity associated with the selected one transit ride option.

10. The system for increasing transit ridership of claim 5, wherein:

the selected one transit ride option comprises a duration requirement;

the memory further comprises instructions that cause the processing unit to determine whether the mobile device has satisfied the duration requirement, the duration requirement indicating an amount of time the mobile device needs to be detected within the entity associated with the selected one transit ride option; and the item is provided to the mobile device based upon the determination of whether the mobile device has satisfied the duration requirement.

11. The system for increasing transit ridership of claim 5, wherein:

the memory further comprises instructions that cause the processing unit to generate a score associated with the mobile device based in part on the usage of the selected one transit ride option.

12. A non-transitory computer-readable medium for increasing transit ridership comprising instructions, that when executed, cause a computing device to:

receive a destination location from a mobile device the destination location comprising an entity;

alert the entity that the entity has been selected by the mobile device;

receive, in response to the alert, at least one transit ride option from the entity;

provide the at least one transit ride option to the mobile device;

receive a selection of one transit ride option of the at least one transit ride option from the mobile device;

detect that the mobile device is present on a transit vehicle associated with the transit ride option by at least one of:
  detecting the mobile device using a beacon of the transit vehicle;
  receiving location data from the mobile device and comparing the location data to a current location of the transit vehicle; or
  detecting the mobile device using a short range radio communications device of the transit vehicle;

determine that the mobile device is present within the entity by at least one of:
  detecting the mobile device using a beacon of the entity;
  receiving location data from the mobile device and comparing the location data to a current location of the entity;
  establishing a geofence around the entity associated with the selected one transit ride option and receiving location information from the mobile device, wherein determining that the mobile device is present within the entity associated with the selected one transit ride option comprises determining that the location information is within the geofence; or
  detecting the mobile device using a short range radio communications device of the entity; and provide at least one item to the mobile device for presentation to one or both of a transit system or the entity based on the determination.

13. The non-transitory computer-readable medium for increasing transit ridership of claim 12, wherein:

the selected one transit ride option comprises an expiration threshold; and the item is provided to the mobile device based upon the determination that the mobile device is present within the entity within the expiration threshold.

\* \* \* \* \*